US008346873B2

(12) United States Patent
O'Neill et al.

(10) Patent No.: US 8,346,873 B2

(45) Date of Patent: Jan. 1, 2013

(54) CONTEXT-BASED IDENTIFICATION OF ENTITY WITH WHICH COMMUNICATION OCCURS

(75) Inventors: Brian M. O'Neill, Pottstown, PA (US); James R. Stogdill, Wayne, PA (US); William D. Back, Jacksonville, FL (US)

(73) Assignee: Accenture Global Services Limited, Dublin (IE)

( * ) Notice: Subject to any disclaimer, the term of this patent is extended or adjusted under 35 U.S.C. 154(b) by 570 days.

(21) Appl. No.: 11/565,539

(22) Filed: Nov. 30, 2006

(65) Prior Publication Data

US 2008/0133670 A1 Jun. 5, 2008

(51) Int. Cl.

| | |
|---|---|
| ***G06F 15/16*** | (2006.01) |
| *G08B 1/00* | (2006.01) |
| *G08B 23/00* | (2006.01) |

(52) U.S. Cl. ...... 709/206; 709/217; 340/531; 340/573.1

(58) Field of Classification Search ........... 709/205–208
See application file for complete search history.

(56) References Cited

U.S. PATENT DOCUMENTS

| | | | | |
|---|---|---|---|---|
| 5,467,008 | A * | 11/1995 | Uchinami | 322/27 |
| 7,194,353 | B1 | 3/2007 | Baldwin et al. | |
| 2001/0044794 | A1 * | 11/2001 | Nasr et al. | 707/4 |
| 2003/0020623 | A1 * | 1/2003 | Cao et al. | 340/686.6 |
| 2003/0182391 | A1 * | 9/2003 | Leber et al. | 709/217 |
| 2003/0235287 | A1 * | 12/2003 | Margolis | 379/265.01 |
| 2006/0047742 | A1 | 3/2006 | O'Neill et al. | |

OTHER PUBLICATIONS

"Communication concerning possible related art" submission dated May 14, 2007.

* cited by examiner

*Primary Examiner* — Ashok Patel
*Assistant Examiner* — Evans Desrosiers

(57) ABSTRACT

An entity is made the target of a communication—such as instant messaging, E-mail, or VoIP—based on a specification of context that the entity satisfies. A user (or other type of entity) who wishes to communication with one or more entities that satisfy a particular context specifies that context at the time the communication is to be sent. A system resolves the context by ascertaining which one or more entities satisfy the context, and the communication is sent to the ascertained entities. In one example, a user can specify that a message is to be sent to an entity at a particular geographic location, and the system chooses the one or more entities that are nearest to the specified location.

17 Claims, 5 Drawing Sheets

CONTEXT-BASED IDENTIFICATION OF ENTITY WITH WHICH COMMUNICATION OCCURS

BACKGROUND

Current presence capabilities are generally based on knowing an identity of a particular user —e.g., the user identified by a particular E-mail address, such as abc@company.com. The ability to contact a person or service is limited to knowing the specific service or user desired. There are a number of possible scenarios, however, in which a user or system merely desires to know the presence of any service or user that meets certain criteria. The criteria about the user other than the user identification are referred to as the "context" of the person or service. This problem is relevant to technologies such as E-mail, instant messaging (IM), and voice over IP (VoIP).

In existing communication systems, it is normally necessary to be able to identify the entity with which one wishes to communicate (e.g., based on a person's E-mail address or telephone number). In some examples, it is possible to identify the entity with which communication is to occur based on some pre-defined label —e.g., a pre-defined group mailing list maintained by an E-mail system. It would be desirable, however, to communicate with one or more persons simply by identifying criteria that the target(s) of the communication are to satisfy.

Relevant background is provided by U.S. Published Patent Application No. 2006/0047742 (O'Neill, et al.), which is hereby incorporated by reference.

SUMMARY

Mechanisms, processes, and techniques are described herein, which allow a user to specify a target of communication based on context. For example, a user could specify that an instant message is to be sent to any sales representative near a certain geographic location, or to any employee with sufficient fuel to reach a certain destination without refueling. One or more entities that satisfy the context are chosen, and an instant message can be sent to that entity, thereby allowing the sender of the message to abstract and objectify the target of the instant message communication, rather than choosing a specific person or persons to whom the message is to be sent. In addition to instant messaging, similar principles can be employed with other forms of communication, such as E-mail or VoIP.

In one example, the subject matter described herein includes a system comprising: one or more processors; one or more data retention devices; a service module that comprises instructions that are executable on at least one of said processors and that are stored in at least one of said data retention devices, that receives, from a plurality of entities, registrations of said entities' presence and information descriptive of said entities' contexts, that receives, from a component, a request including a context, and that provides, to said component, identification of one or more of said entities that satisfy said context; and said component, which provides a mechanism through which a user may specify an identifier associated with a first one of said entities with whom communication involving said user and said first one of said entities is to take place, that receives, using said mechanism, a specification of said context, that provides said request to said service module, that receives said identification of said one or more of said entities from said service module, and that causes said communication to occur involving said user and said one or more of said entities.

In another example, the subject matter described herein includes one or more computer-readable media having stored thereon computer-executable instructions to implement a method, the method comprising: receiving registrations from at least some of a plurality of entities, each registration representing presence of a particular one of the plurality of entities; receiving items of information descriptive of contexts associated with said at least some of said plurality of entities; receiving, from a component, a request for a set of entities, said request specifying a context; ascertaining, based on said registrations, said items of information, and said context, a set selected from said at least some of said plurality of entities, wherein said entities contained in said set satisfy said context according to one or more criteria, wherein each of said plurality of said plurality of entities is associated with an identifier, and wherein said ascertaining is performed independently of any relationship that may exist between said identifier and said context; first providing identification of said set of entities to said component; second providing a mechanism through which an identifier associated with one of said entities is providable by a user; enabling a communication to occur involving a user and said set of entities, said communication being in a form, and wherein combinations of said mechanism and said form are selected from the group consisting of: said form constituting e-mail communication, and said mechanism comprising a text field into which said user may type an e-mail address; said form constituting instant messaging communication, said mechanism comprising a user interface through which a user may specify an instant messaging identifier; and said form constituting VOIP communication, said mechanism comprising a user interface through which a user may specify a VOIP identifier; wherein said receiving acts, said ascertaining act, and said first providing act are performed by a service module, wherein said second providing act and said enabling act are performed by said component, said component and said service module being software items that are distinct from each other and that are implemented by the instructions stored on said one or more computer-readable media.

In another example, the subject matter described herein includes a method comprising: receiving, from a first entity, a specification of a context; subsequent to said receiving, ascertaining one or more of a plurality of second entities that satisfy said context, said one or more entities being ascertained entities; and causing first information to be transmitted from said first entity to said ascertained entities, wherein which ones of the plurality of second entities that satisfy said context is changeable over time.

Other features are described below.

DETAILED DESCRIPTION

Overview

The target of a particular communication is usually specified based on the target's identity. For example, a first user who sends an E-mail to a second user normally specifies the second user based on the second user's E-mail address (bob@company.com). However, sometimes it is desirable to specify the target of communication based on context rather than identity. For example, if one needs to communicate with a sales representative who is currently located in downtown Minneapolis, or a soldier patrolling a particular area in a war zone, it may be less relevant to be able to send an E-mail to "Bob," and more relevant to be able to send an E-mail to "sales representative near Minneapolis" or "U.S. soldier on patrol near 62° N latitude, 114° W longitude." The subject matter described herein provides for a communication target to be identified based on context.

In accordance with what is herein described, an agent may register with a presence server along with contextual information about a service or user. The presence server stores the agent and associated contextual information. Agents can update the information at any time and drop their presence information.

Another agent can then request presence of any user matching a given set of contextual information. The presence server may search for the currently present agents matching the context and return one or more agents. The context to be matched can be complex, and services can be returned that match some or all of the contextual information, based on the user invocation. In one example, a user can simply request that a communication be made (e.g., by E-mail, instant messaging, voice, etc.) with a user, system, or agent whose context is described, and the system will choose the context and initiate or complete a communication with the appropriate user.

User interfaces can be developed to display the presence of other users based on context. Agents could potentially match multiple contexts and therefore show up in multiple groups.

The following features and advantages are provided:

The following features should be protected:

The ability to register presence with contextual information (where attributes may change over time).

The ability to detect presence based on contextual information.

The ability to communicate with a user or service based on context rather than a user ID.

The ability to organize and view presence information based on the contextual information.

Example System

Figure 1:
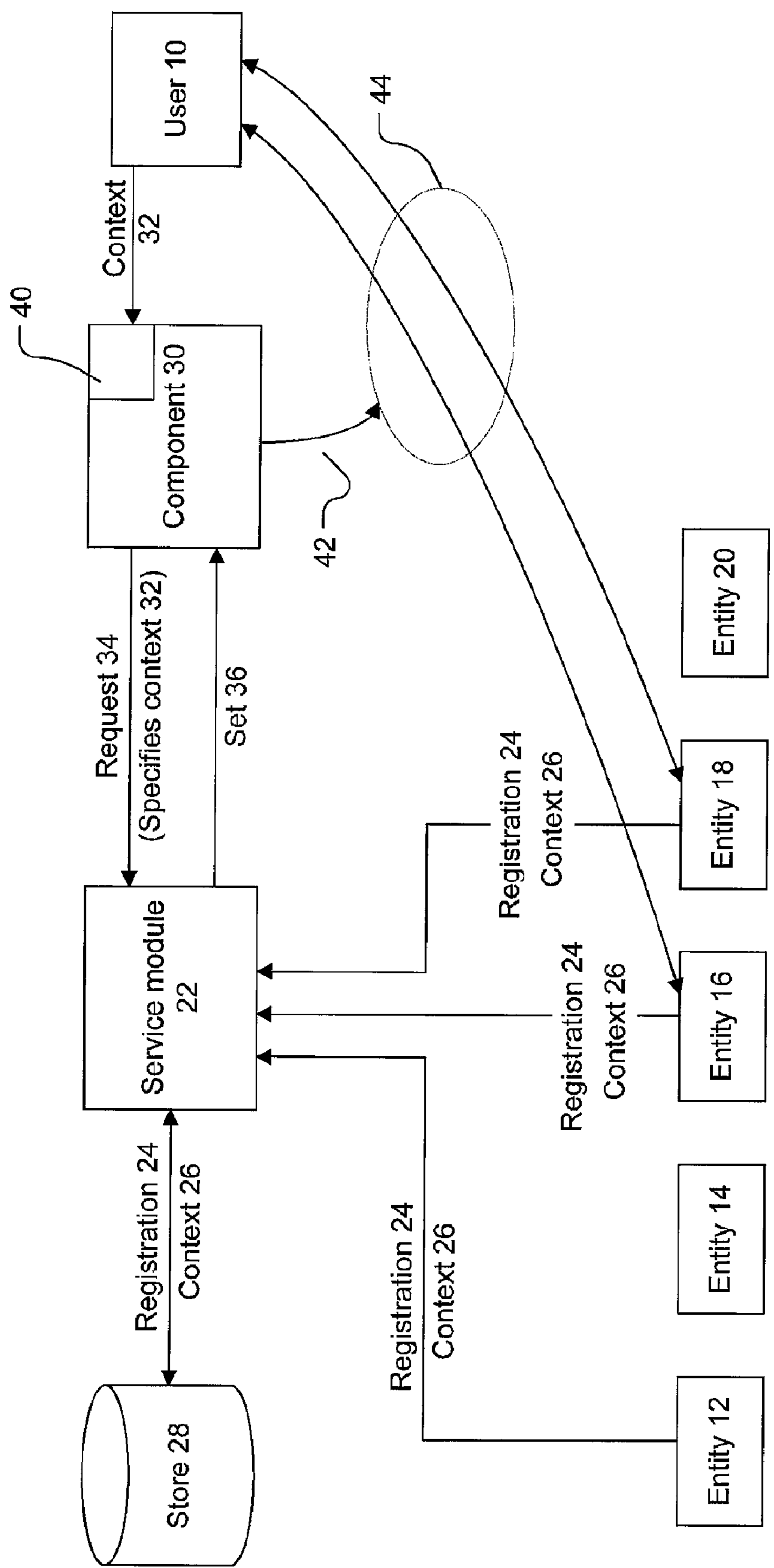
FIG. 1 is a block diagram of an example system.

FIG. 1 is a block diagram of a system showing example aspects of the subject matter described herein.

User 10 is a person, who uses the components shown in FIG. 1 as part of a process of engaging in communication with other entities. Although user 10 is typically a person, it is possible for user 10 to be something other than a human being—e.g., user 10 could be a machine, computer program, or other type of component that engages in communication with entities.

An entity (e.g., entity 12) can be a person, machine, collection of persons and/or machines, or any other type of entity that is capable of engaging in some type of communication with user 10. A plurality of entities, 12, 14, 16, 18, and 20, are shown.

Service module 22 is a component that receives registrations 24 and context information 26 from at least some of the plurality of entities 12, 14, 16, 18, and 20. In the example of FIG. 1, entities 12, 16, and 18 have registered with service module 22 and provided their respective context information 26 to service module 22. Typically, service module 22 is implemented as software that executes on a computer.

Registration 24 is essentially an indication of a particular entity's presence—i.e., it is an indication that a particular entity is available to engage in communication, should that entity be called upon to do so. Thus, the plurality of entities might represent all entities of some type (e.g., the number of sales agents in the field), while the set of registered entities is a subset (but not necessarily a proper subset) of the plurality of entities. For example, the set of registered entities might be that subset of the whole set of entities who are within communication range of a particular communication network (i.e., the subset of entities who are within wireless communication range of some wireless communication network).

Context 26 is an indication of some attribute that is presently true about a particular entity. A non-exhaustive list of example of things that context 26 could represent is: a particular entity's current geographic position expressed in latitude and longitude, the number of gallons of fuel remaining in the entity's vehicle, the number of seconds remaining until the entity goes off duty, etc.

Registrations 24 and contexts 26 can change over time. For example, an entity whose presence had previously been registered may become unregistered if the entity strays out of range of any access point on a particular wireless communication network. Similarly, the context for any given entity can change as well—e.g., if the context describes the entities position, that context will change when the entity physically moves to another location, or if the context describes the number of gallons of fuel remaining in the entity's vehicle, that context will change as the fuel becomes depleted. It is typical for context and registration to change over time, and to change recurrently.

Service module 22 may store registrations 24 and context information 26 in store 28. Store 28 represents a place in which information may be stored, and from which information may be retrieved. For example, store 28 may be implemented as a database. In a case where service module 22 is implemented as a computer program that runs on a computer, store 28 may be a program module that operates on that computer in order to store registrations 24 and context information 26 on the computer's hard disk, and to retrieve registrations 24 and context information 26 from that hard disk.

A function of service module 22 is to determine which of the entities 12, 14, 16, 18, and 20 are present and satisfy a particular context 32. User 10 specifies this context to component 30, which in turn issues a request 34 to service module 22. Request 34 specifies the context 32 that user 10 specified to component 30. Service module 22 receives request 34 and ascertains which of entities 12, 14, 16, 18, and 20 are present and satisfy context 32. The question of what satisfies context 32 may be determined according to one or more criteria. Service module 22 then provides a set 36 of entities that are present and that that satisfy said context 32.

The component 30 shown in FIG. 1 represents various types of specific components with which user 10 could interact. A non-exhaustive list of specific examples of component 30 includes: E-mail software, through which a user can create E-mail and specify addresses to which the E-mail is to be sent; instant messaging software, through which a user can create instant messages and specify recipients to which the instant messages are to be sent; and voice-over-internet-protocol (VOIP) software that allows a user to send audio information to (and possibly receive audio information from) other parties. Component 30 is not limited to the specific examples described above, and may be embodied by other related means.

Figure 4:
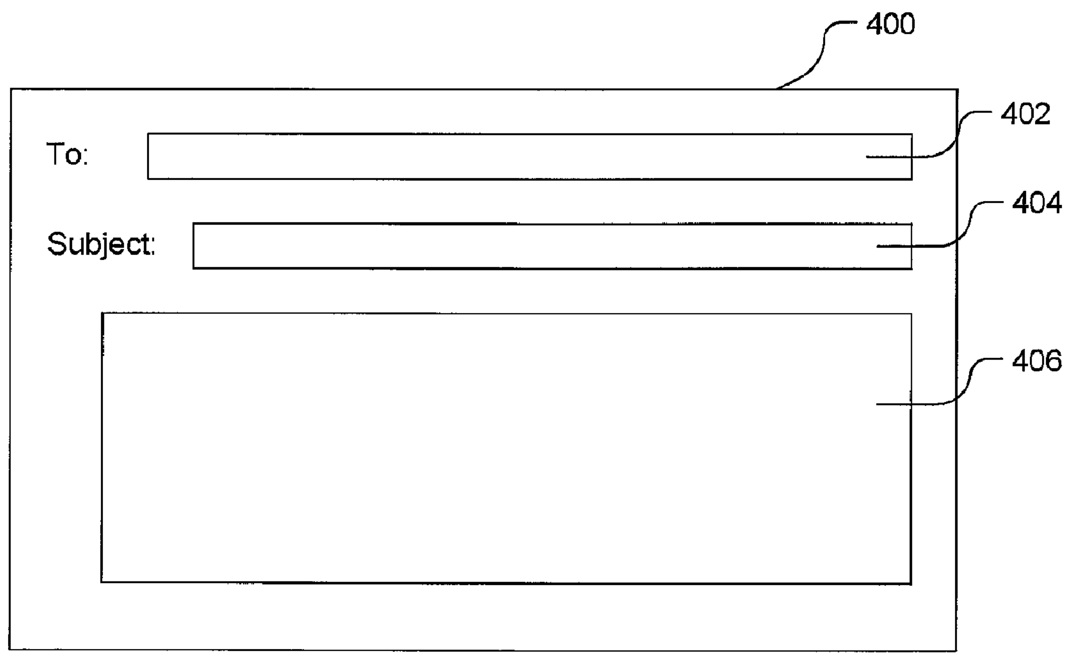
FIG. 4 is a block diagram of aspects of an E-mail interface.
Figure 5:
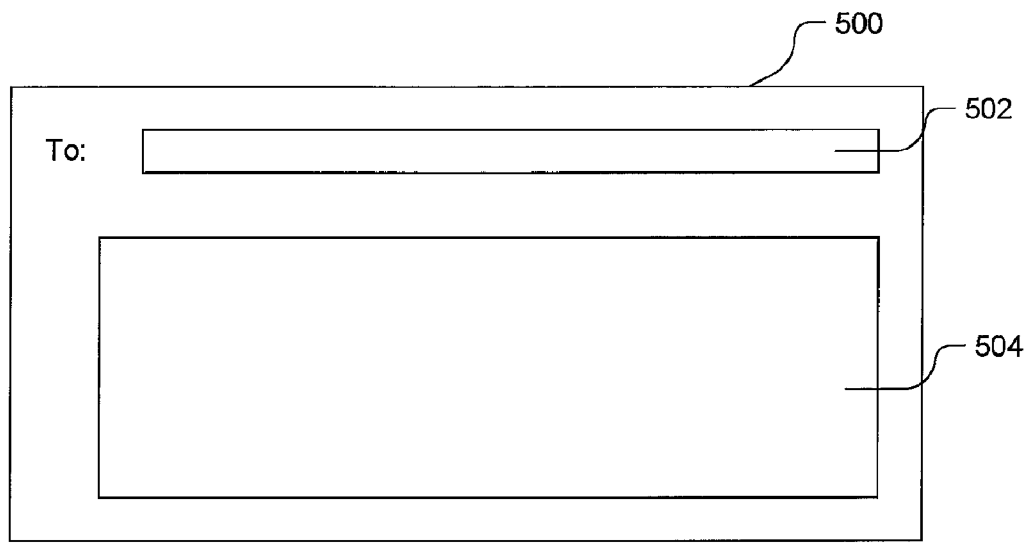
FIG. 5 is a block diagram of aspects of an instant messaging interface.
Figure 6:
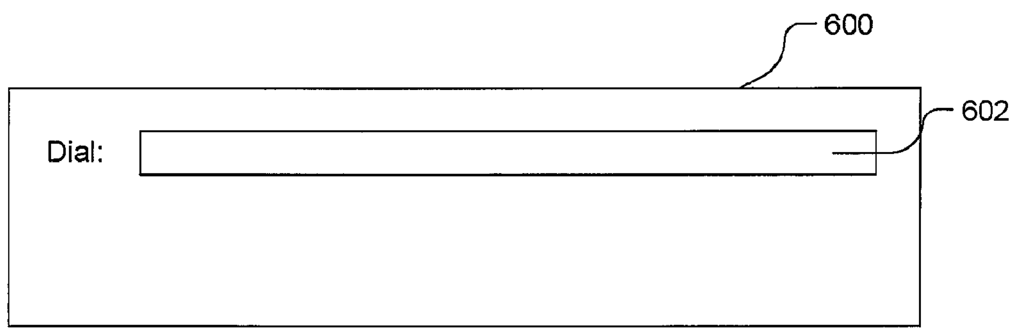
FIG. 6 is a block diagram of aspects of an example VoIP interface.

Component 30 typically provides a mechanism 40 through which user 10 specifies context 32. Mechanism 40 preferably has the characteristic that it is adapted to receive an identification of one or more specific entities 12, 14, 16, 18, and 20 with whom communication involving user 10 is to occur. But, instead of using mechanism 40 to specify one or more particular entities, user 10 uses mechanism 40 to specify context 32. For example, if component 30 is E-mail software, then mechanism 40 may comprise the user interface through which the user enters information into the E-mail program, including a "to" field in which a user enters the E-mail address(es) of the recipient(s) of the E-mail message. Similarly, if component 30 is instant messaging software, then mechanism 40 may comprise the user interface of the instant messaging software, including the portion of that interface through which a user specifies the recipient of an instant message. Instead of using mechanism 40 to specify a specific entity that is to receive the instant message, user 10 uses mechanism 40 to specify a context. If component 30 is VoIP software, then mechanism 40 may comprise the user interface through which a user specifies the entity who is to receive audio information (or to whom a two-way call is to be placed); thus mechanism 40 could comprise a field into which a telephone number or other identifier is to be entered, or a mechanism by which a telephone number or other identifier is audibly collected (e.g., by speech or by receipt of dual-tone multifrequency (DTMF). Instead of using mechanism 40 to specify a telephone number or other identifier, user 10 uses mechanism 40 to specify a context —e.g., by typing that context into the specified field, or by speaking (or otherwise audibly) communicating the context. Examples of mechanism 40 are shown in FIGS. 4-6 and are discussed below. It will be appreciated that the examples discussed here, and those shown in FIGS. 4-6, are not exhaustive, and numerous other examples are possible without departing from the spirit and scope of the described subject matter.

Once component 30 has become aware of a specific set 36 of entities with whom a communication involving user 10 is to take place, component 30 causes communication between user 10 and the one or more entities in set 36. In the example of FIG. 1, the entities in set 36 are entities 16 and 18, so component 30 causes communication to occur between user 10 and entities 16 and 18. For example, component 30 may cause an E-mail or instant message written by user 10 to be directed to entities 16 and 18. Or, component 30 may cause an audio message created by user 10 to be sent to entities 16 and 18. Or component 30 may set up one or more two-way (or multi-way) calls between user 10 and the entities in set 36. The causing of communication to occur by component 30 is represented by arrow 42 and circle 44.

Service module 22 is described above as providing set 36 to component 30 so that component 30 can cause communication to occur between user 10 and the entities in set 36. Additionally, service module 22 can be queried to provide a set of entities that satisfy context for some reason other than enabling component 30 to cause communication to occur with those entities. For example, one might simply want a list of entities that have a registered presence and that satisfy some context so that the list can be printed or displayed. Service module 22 can be queried with a context and can provide that set, which can then be displayed or printed by appropriate software.

As mentioned above, service module 22 determines which of entities 12, 14, 16, 18, and 20 satisfy context 32 according to one or more criteria. The one or more criteria can take various forms, depending on what type of context is involved and what type of information is available. For example, if the context specifies a geographic location, then a non-exhaustive description of example conditions that the criteria may specify is that the context is satisfied by: the entity that is closest to the specified geographic location; or all entities that are within five miles of the specified location; or the three closest entities to the specified location, etc. In essence, the foregoing are examples of positional predicates. If the context specifies an amount of time that an assignment will take, then a non-exhaustive description of example conditions that the criteria may specify is that the context is satisfied by: the entity that has the most time available before going off-duty; all entities that have sufficient time left before going off duty; the entity that has the sufficient time left before going off-duty and that has least recently been asked to perform an assignment, etc. This is a small number of examples of the criteria, and how the criteria may be compared with a context. These examples are not exhaustive, and numerous other examples are within the spirit and scope of the subject matter described herein.

Preferably, service module 22 determines which entities satisfy a particular context independently of identifiers that may be associated with the entity. For example, a particular entity may be associated with an E-mail address—e.g., the e-mail address for entity 12 may be abc@company.com. However, the subject matter described here can identify entities with which communication is to occur, rather than merely receiving a user's specification of a particular entity. Thus, service module 22 may determine which entities satisfy a context independently of any relationship that might exist between the context and the E-mail address (or other identifier). For example, a user could specify an E-mail address (e.g., "abc@company.com"), or a even a piece of an E-mail address that is to be resolved once it has been unambiguously identified, as modern E-mail programs tend to do (e.g., "abc@co" resolves to "abc@company.com"). However, if service module 22 were to ascertain that entity 12 is in the set of entities that satisfy that context simply by determining that the E-mail address (or portion thereof) specified is similar to entity 12's actual E-mail address, then service module 22 would be ascertaining the set of entities non-independently of the relevant identifiers. Similarly, if the user were to specify the name of some pre-defined group or distribution list of which "abc@company.com" happened to be a member, and if service module were simply to use that list based on what the user had specified, this scenario, again, would be an example of ascertaining the set of entities non-independently of the relevant identifiers. In accordance with the subject matter described herein, service module 22 is able to ascertain the set of entities that satisfy a context independently of any relationship that might exist between the identifiers and the specified context. For example, if service module 22 were to ascertain that entity 12 is in the set of entities that satisfy a context based on entity 12's location rather than the particular E-mail address assigned to entity 12, then service module 22 would be making that determination independently of any relationship between the specified context and the E-mail address that happens to be assigned to entity 12.

Example Processes

Figure 2:
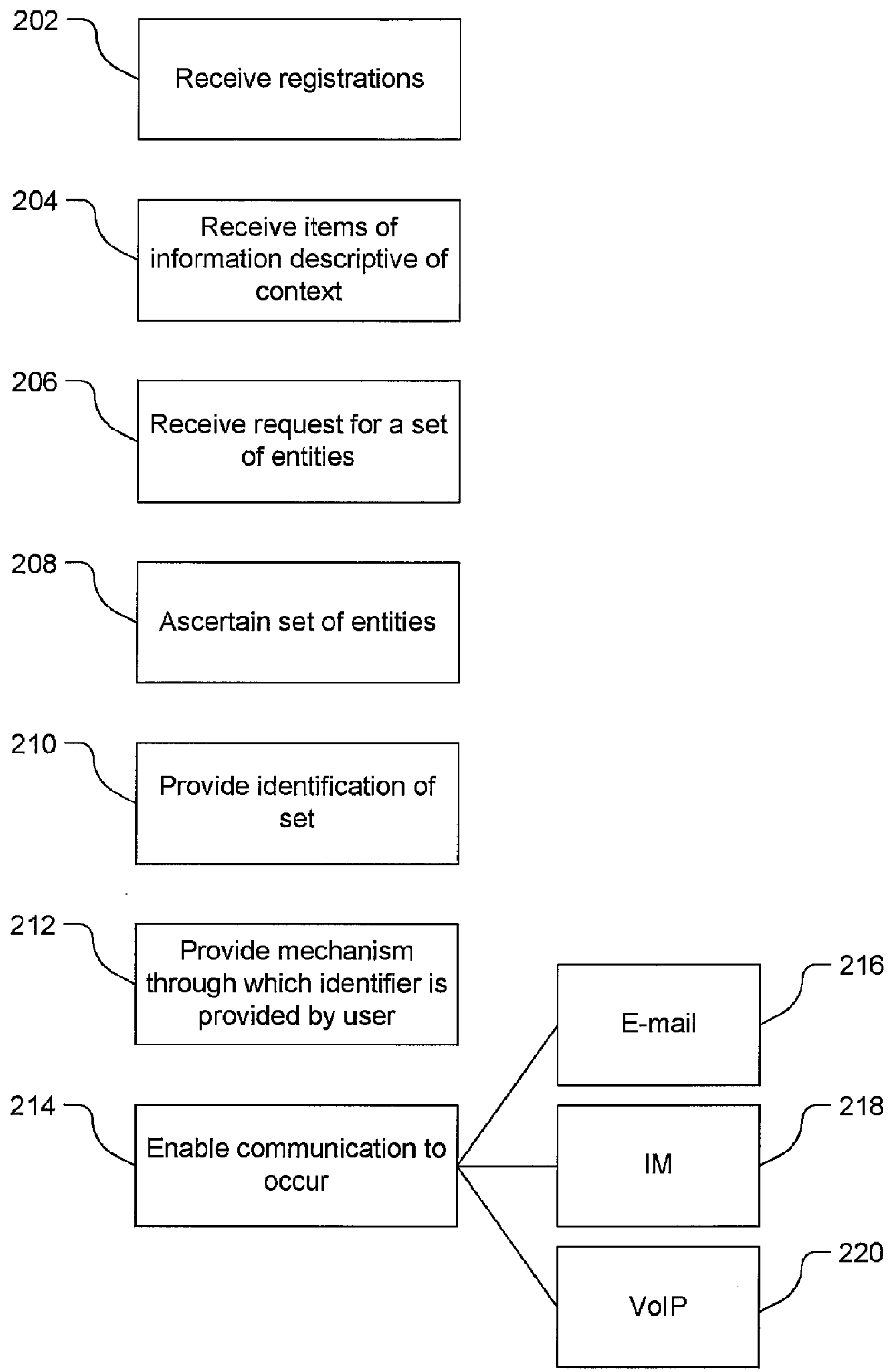
FIG. 2 is a flow diagram of a first example process.

FIG. 2 shows an example process that may be implemented in accordance with the subject matter described herein. The order in which acts are performed is not limited by the vertical order of the blocks shown in FIG. 2.

At block 202, registrations are received from entities. For example, if there are five entities (as shown in the example of FIG. 1), then registrations may be received from at least some of those entities. The registration represents the presence of that entity, as described above.

At block 204, items of information descriptive of the registered entities' context are received from the registered entities.

At block 206, a request for a set of entities is received from a component. This request typically specifies a context. Request 34 (shown in FIG. 1) is an example of the type of request that may be received at block 206. Component 30 (shown in FIG. 1) is an example of the component from which this request may be received.

At block 208, a set of entities is ascertained. This ascertainment of a particular set of entities is based on a consideration of the context specified in the above-mentioned request, the items of information that represents the various entities' contexts, and which entities have a registered presence. One or more criteria, as described above, are used to determine based on the above-mention factors which entities satisfy the context. The ascertainment of which entities satisfy the criteria may be performed independently of any relationship that may exist between the context specified and some identifiers associated with the entities. Preferably, the set of entities that are ascertained at this block is limited to those entities that are known to have a valid registration (e.g., a registration that represents an entity's actual or believed presence). The entities that are ascertained at block 208 may be communicated to the user—e.g., by printing out the list, or by displaying the list on a monitor. This may be useful, in the case where the user specifies a context in order to find out which present entities satisfy the specified context.

At block 210, identification of the set of entities is provided to the above-mentioned component.

At block 212, a mechanism is provided through which an identifier associated with an entity may be provided by a user. For example, as more particularly described above, the user interface of an E-mail program, through which a user may enter one or more E-mail addresses for the recipients of an E-mail, is an example of such a mechanism.

It should be noted that both blocks 210 and 212 describe acts of providing something. In some contexts, these providing acts may be distinguished by referring to them as "first providing" and "second providing." The ordinal numbers in such a context are simply labels that distinguish the labeled acts, but these labels do not imply a temporal order among the labeled acts.

At block 214, communication is enabled to occur involving the above-mentioned user and the set of entities identified above at block 210. This communication may, for example, take the form of E-mail 216, instant messaging 218, or VoIP 220.

In the case where the form of communication is E-mail, the mechanism mentioned above in connection with block 212 may comprise a text field into which an E-mail address is typeable (although the user could type a context into such field instead of an E-mail address).

In the case where the form of communication is instant messaging, the mechanism mentioned above in connection with block 212 may comprise a user interface through which a user may specify one or more entities' instant messaging identifier(s) (although the user could use such user interface to specify a context instead of an instant messaging identifier) .

In the case where the form of communication is VoIP, the mechanism mentioned above in connection with block 212 may comprise a user interface through which a user may specify a VoIP identifier (although the user could use such user interface to specify a context instead of a VoIP identifier).

In the example of FIG. 2, the blocks above the dashed line are performed by a service module (such as service module 22, shown in FIG. 1), and the blocks below the line are performed by a component (such as component 30, shown in FIG. 1).

Figure 3:
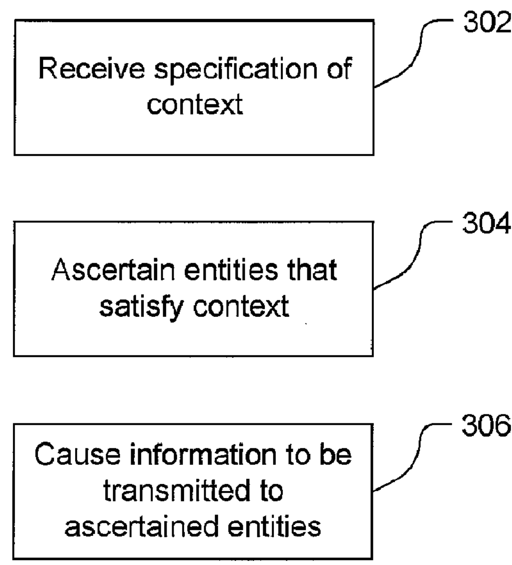
FIG. 3 is a flow diagram of a second example process.

FIG. 3 shows another example process that may be implemented in accordance with the subject matter described herein. The order in which acts are performed is not limited by the vertical order of the blocks shown in FIG. 3.

At block 302, a specification of context is received from a first entity. The first entity may, for example, be user 10 (shown in FIG. 1). (User 10 is simply an example of an entity.)

At block 304, one or more second entities are ascertained that satisfy the context specified at block 302. (The second entities are referred to as "second" in order to distinguish them from the "first" entity mentioned above; it will be understood that ordinal numbers are used solely as distinguishing labels, and do not imply an order among the entities.) For example, entities 12, 14, 16, 18, and 20 (shown in FIG. 1) are examples of second entities that may be considered to ascertain whether they satisfy the context. In another example, the consideration of entities may be limited to those entities that have a registered presence (e.g., entities 12, 16, and 18). At block 304, it is ascertained which one or more of the entities being considered satisfy the context. For example, entities 16 and 18 may both be determined to satisfy the context specified at block 302. The entities that have been ascertained to satisfy a specified context can, in this example, be referred to as ascertained entities. As noted above, the vertical depiction of blocks in FIG. 3 does not in itself imply an order; however, block 304 is normally performed after block 302.

The ascertainment described in block 304 can be performed independently of any relationship that may exist between the specified context and any identifiers associated with the second entities. For example, if the second entities are each associated with an E-mail address, the ascertainment of which second entities satisfy the specified context can be performed independently of any relationship that may exist between the specified context that the E-mail addresses.

Moreover, the ascertainment can be dependent on information that the second entities have provided. For example, the second entities may provide information reporting their context (e.g., geographic position, gallons of fuel left, time left before going off duty, etc.), and the ascertainment of which entities satisfy the context can be made dependent on this information provided by the second entities. In one example, the context specifies a position, and which entities satisfy the context is determined based on which entities most-recently-updated descriptions of their own location indicate that they satisfy the context.

At block 306, information is caused to be transmitted from the above-mentioned first entity to those one or more second entities that have been ascertained at block 304. For example, the transmission of information may comprise sending an E-mail message to the ascertained one or more entities, sending an instant message to the ascertained one or more entities, or sending audio information by VoIP to the ascertained one or more entities.

It should be noted that which of the second entities satisfy a given context can change over time. For example, if the context specifies a geographic position and the entities are capable of movement, then at any given time, it may be a different set of entities that satisfy the specified context.

Example Mechanisms Through Which Context May Be Specified

FIGS. 4-6 show examples of mechanism 40, which is shown in FIG. 1 and discussed above.

FIG. 4 shows an example user interface 400 that allows a user to enter an E-mail message and specify one or more recipients to whom the message is to be delivered. Field 402 is a "to" field, in which a user enters the E-mail address(es) of one or more recipients for the message. Field 404 is the subject field, in which the user may enter a subject. Field 406 is a text field, in which a user may enter (e.g., by typing) the body of the E-mail message. "To" field 402 is an example of mechanism 40, in the sense that it is a field designated for the collection of identifiers (such as E-mail addresses) of recipients to whom the message is to be delivered. In this field, a user may enter a context. E.g., instead of entering into this field an E-mail address (such as abc@company.com), the user may enter "sales representative closest to 390 N latitude, 1260 E longitude."

FIG. 5 shows an example of a user interface 500 that allows a user to enter an instant message. Field 502 is a "to" field, in which a user enters the instant messaging identifier(s) of one or more recipients who are to receive an instant message. Field 504 is a text field, into which a body of the instant message is entered (e.g., by typing). "To" field 502 is an example of mechanism 40, in the sense that it is a field designated for the collection of identifiers (such as instant messaging identifiers) of recipients to whom the message is to be delivered. In field 502, a user may enter a context. E.g., instead of entering an instant messaging identifier, the user may enter "reporter closest to 510 N latitude, 710 E longitude."

FIG. 6 shows an example of a user interface 600 that allows a user to engage in a VoIP communication. Field 602 is a place in which a user may enter (e.g., by typing) a VoIP identifier associated with the target of the VoIP communication. In one example, the VoIP identifier is a telephone number. User interface 600 is an interface that could be presented by a computer or similar device, in which the user could type the VoIP identifier. However, inasmuch as VoIP relates to audible communication, it will be understood that there are other ways that the VoIP identifier could be collected—e.g., by spoken audible information, or by audible information generated by a dual-tone multi-frequency (DTMF) keypad. The mechanism by which a VoIP system receives a VoIP identifier is an example of mechanism 40. Using this mechanism, a user could specify a context instead of entering a VoIP identifier.

Example Usage Scenarios

Figure 7:
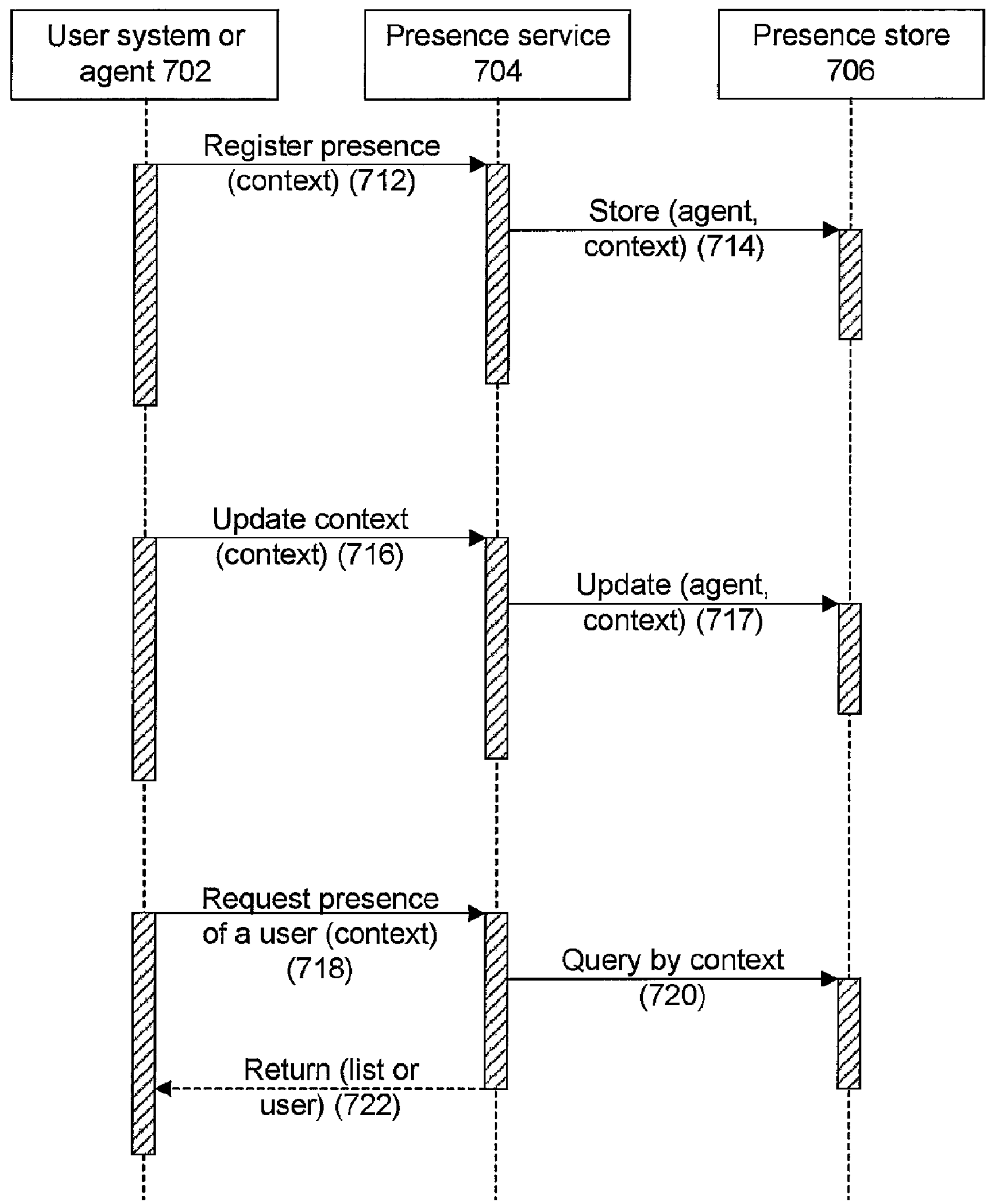
FIG. 7 is a diagram showing example actions that may take place according to the disclosed subject matter.

FIG. 7 shows example scenarios in which aspects of the subject matter described herein may be used.

User or system agent 702 is an example of the user 10 (shown in FIG. 1). Presence service 704 is an example of the service module 22 (shown in FIG. 1). Presence store 706 is an example of the store 28 (shown in FIG. 1).

In one example, user or system agent 702 registers (712) its presence with presence service 704, and presence service 704 stores (714) an association between the agent and its context in presence store 706.

In another example, user or system agent 702 updates (716) its context with presence service 704, and presence service 704 stores (717) the updated context associated with that agent in presence store 706.

In another example, user or system agent 702 requests (718) a user based on context from presence service 704. The presence service 704 queries (720) presence store 706, and returns (722) a user or list of users who satisfy the context.

Example Implementation Issues

Program code to perform any of the functionality described herein can be stored on one or more computer-readable media (e.g., optical or magnetic disk, tape, semi-conductor memory, etc.), and then loaded into the computing device that implements such a router. The use of such media to store and load such program code is generally known in the relevant field.

Aspects of the subject matter described herein may be deployed in an apparatus that comprises one or more processors (e.g., one or more central processing units), and/or one or more data-retention devices (e.g., disks, tapes, semi-conductor memories, etc.). For example, the various components, modules, etc., described herein may be implemented in the form of such apparatus, by storing program code in one or more of the data-retention devices, and by causing the stored code to execute on one or more of the processors.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:

a processor;

a data retention device coupled to said processor and that stores instructions that are executable on said processor; and a service module coupled to said data retention device and that receives, from each entity in a plurality of entities, registrations of each of said entities' presence and first information other than location information, wherein said first information comprises an entity-specific value for a quantifiable and variable property associated with said entities, and wherein said service module receives, from a component, a request for said service module to identify which of said entities has a value for said property that satisfies a specified criterion, wherein said request further comprises a context, wherein said context comprises second information other than location information that generally describes a targeted entity but does not specifically identify said targeted entity and wherein a message is associated with said request, wherein in response to said request said service module performs a search of said first information and provides, to said component, identification of one or more of said entities whose respective value for said property satisfies said criterion and unique contact information for each of said one or more entities, and wherein in response to receiving said identification, said component causes said message to be automatically delivered to said one or more entities;

wherein said context comprises descriptions of locations of said entities, wherein said context comprises a description of a geographic position, wherein said service module ascertains said one or more of said entities based on which of said entities' description of location satisfies a positional predicate with respect to the geographic position described in said context.

2. The system of claim 1, wherein said entities are associated with corresponding identifiers comprising said unique contact information, wherein said context does not contain or specify any of said identifiers, and wherein said service module ascertains said one or more of said entities that satisfy said context independently of any relationship that may exist between said context and said identifiers.

3. The system of claim 1, wherein said unique contact information comprises e-mail addresses associated with said entities and said message comprises an e-mail message, wherein said component is operable for sending e-mail to said one or more of said entities, said component having a user interface comprising a field designated to receive an e-mail address.

4. The system of claim 3, wherein said field is a "to" field operable for receiving said e-mail address, said component being configured to recognize that said context has been entered into said field in place of said e-mail address, and said component being configured to send said e-mail message to said one or more of said entities identified by said context in place of sending e-mail to said e-mail address.

5. The system of claim 2, wherein said identifiers comprise instant messaging identifiers associated with said entities and said message comprises an instant message, wherein said component is operable for sending said instant message to said one or more of said entities, said component having a user interface comprising a field designated to receive an instant messaging identifier.

6. The system of claim 2, wherein said identifiers comprise VoIP identifiers associated with said entities, wherein said component is operable for facilitating a VoIP communication with said one or more of said entities, said component having a user interface comprising a user input mechanism through which a VoIP identifier may be identified.

7. The system of claim 1, further comprising: a storage module that stores, in said data retention device, said registrations and said information, wherein said service module consults said storage module, and uses said registrations and said information stored by said storage module, to ascertain which of said entities satisfy said context.

8. The system of claim 1 wherein said component provides a mechanism through which a user may specify an identifier associated with a first one of said entities with whom communication involving said user and said first one of said entities is to take place; receives, using said mechanism, a specification of said context; provides said request to said service module; receives said identification of said one or more of said entities from said service module, and causes said communication to occur involving said user and said one or more of said entities.

9. The system of claim 1 wherein said context comprises characteristics attributable to said targeted entity but not an identifier unique to said targeted entity.

10. The system of claim 1 wherein said property is selected from the group consisting of: amount of fuel remaining; and amount of time remaining on duty.

11. A non-transitory computer-readable storage media having stored thereon computer-executable instructions to implement a method comprising:

receiving registrations from a first set of entities of a plurality of entities, each registration representing presence of a respective entity in said first set;

receiving items of information descriptive of contexts associated with each entity in said first set of entities, wherein said contexts comprises first information comprising information other than locations of said entities in said first set, wherein said first set information comprises an entity-specific value for a quantifiable and variable property associated with said entities in said first set;

receiving a request to identify which of said entities in said first set has a value for said property that satisfies a specified criterion, wherein said request further comprises a context, wherein said context comprises second information other than location information that generally describes a targeted entity but does not specifically identify said targeted entity and wherein a message is associated with said context;

based on said registrations, said first information, and said second information and in response to said request, searching said first information and ascertaining a second set of entities selected from said first set, wherein entities contained in said second set have a value for said property that satisfies said criterion, wherein each of said entities in said second set is associated with an identifier comprising unique contact information for each entity in said second set; and providing identification of said second set of entities and said identifier for each entity in said second set, wherein in response to said identification being received, said message is automatically delivered to said second set of entities;

wherein said context comprises descriptions of locations of said entities, wherein said context comprises a description of a geographic position, wherein said service module ascertains said one or more of said entities based on which of said entities' description of location satisfies a positional predicate with respect to the geographic position described in said context.

12. The computer-readable storage media of claim 11, wherein the method further comprises: limiting said second set to those of said entities for which a valid registration is known.

13. The computer-readable storage media of claim 11, wherein said method further comprises: providing a list comprising said second set of entities to a user.

14. The computer-readable medium of claim 11 wherein said message is in a form, and wherein combinations of said mechanism and said form are selected from the group consisting of:

said form constituting e-mail communication, and said mechanism comprising a text field operable for receiving an e-mail address;

said form constituting instant messaging communication, said mechanism comprising a user interface operable for receiving an instant messaging identifier; and said form constituting VoIP communication, said mechanism comprising a user interface operable for receiving a VoIP identifier.

15. A method comprising:

receiving registrations from a first set of entities of a plurality of entities, each registration representing presence of a respective entity in said first set;

receiving items of information descriptive of contexts associated with each entity in said first set of entities, wherein said contexts comprises first information comprising information other than locations of said entities in said first set, wherein said first set information comprises an entity-specific value for a quantifiable and variable property associated with said entities in said first set;

receiving a request to identify which of said entities in said first set has a value for said property that satisfies a specified criterion, wherein said request further comprises a context, wherein said context comprises second information other than location information that generally describes a targeted entity but does not specifically identify said targeted entity and wherein a message is associated with said context;

based on said registrations, said first information, and said second information and in response to said request, searching said first information and ascertaining a second set of entities selected from said first set, wherein entities contained in said second set have a value for said property that satisfies said criterion, wherein each of said entities in said second set is associated with an identifier comprising unique contact information for each entity in said second set; and providing identification of said second set of entities and said identifier for each entity in said second set, wherein in response to said identification being received, said message is automatically delivered to said second set of entities;

wherein said context comprises descriptions of locations of said entities, wherein said context comprises a description of a geographic position, wherein said service module ascertains said one or more of said entities based on which of said entities' description of location satisfies a positional predicate with respect to the geographic position described in said context.

16. The method of claim 15, further comprising limiting said second set to those of said entities for which a valid registration is known.

17. The method of claim 15, further comprising providing a list comprising said second set of entities to a user.

* * * * *